United States Patent [19]
McPherson

[11] Patent Number: 5,882,015
[45] Date of Patent: Mar. 16, 1999

[54] FLOATING TOOLHOLDER

[75] Inventor: Ronald L. McPherson, Raymond, N.H.

[73] Assignee: John B. Packard, Southampton, N.H.

[21] Appl. No.: 919,142

[22] Filed: Aug. 27, 1997

[51] Int. Cl.⁶ .................................................. B23B 31/02
[52] U.S. Cl. .............................. 279/16; 408/240; 470/96
[58] Field of Search .............................. 279/16; 408/238, 408/239 R, 240; 470/96

[56] References Cited

U.S. PATENT DOCUMENTS

| | | |
|---|---|---|
| 1,155,796 | 10/1915 | Cleveland . |
| 1,244,648 | 10/1917 | Sheuman ..................................... 279/16 |
| 1,903,576 | 4/1933 | Skee et al. . |
| 2,848,239 | 8/1958 | Benjamin et al. . |
| 3,553,753 | 1/1971 | Hundley ..................................... 279/16 |
| 4,111,442 | 9/1978 | Wawrzyniak ........................... 408/238 |
| 4,514,115 | 4/1985 | Akashi . |
| 4,547,101 | 10/1985 | Dowdakin, Sr. . |
| 4,984,942 | 1/1991 | Holtz . |
| 5,013,054 | 5/1991 | Burnet . |
| 5,342,069 | 8/1994 | Wellach . |

Primary Examiner—Steven C. Bishop
Attorney, Agent, or Firm—Davis and Bujold

[57] ABSTRACT

A tool holder that allows floating to accommodate radial displacement including: a shank, having a bore at one end, the bore being perpendicular to the longitudinal axis of the shank; a mounting head, with cavities at both ends at least one bore extending radially to each cavity from the outside surface of the mounting head, wherein the shank extends into the cavity at one end of the mounting head; a tool mounts in the other cavity of the mounting head; a pin connecting the shank and the mounting head, with a sliding fit through the bore of mounting head, and a clearance fit through the shank, wherein the clearance fit and clearance between the shank and the cavity member allows a floating freedom of slightly greater than twice the anticipated eccentricity between the centerline of the shank and the centerline of a workpiece hole; and a device for securely engaging the tool in the cavity at the first end of the mounting head.

12 Claims, 1 Drawing Sheet

FLOATING TOOLHOLDER

FIELD OF THE INVENTION

This invention relates to an improved floating toolholder of straight forward design.

BACKGROUND OF THE INVENTION

Manufacturers of products ranging from aircraft and automobiles to home appliances share the need for effective means to cut (tap) female screw threads. Most commonly these threads are generated with threading taps, this is almost exclusively so in the case of small diameter threads. The general design of these taps is well established and their functional purpose well known to those skilled in the art of machining.

The technique for quickly and efficiently tapping large numbers of female threads on an automatic machine tool differs from the technique used by a craftsman charged with the task of tapping threads individually using manual methods. The craftsman can drill and tap a workpiece using a single spindle without disturbing the workpiece on the table of his drill press. He can be sure, therefore, that the tap enters the drilled hole squarely and precisely on center. Automatic machines, on the other hand, either move the workpiece from one station (tap drilling) to another (tapping), or bring spindles successively into position first to drill and then tap a fixed workpiece.

Incident to the technique of moving the workpiece, or shifting spindles between operations, is the problem of centering the tap precisely on the drilled hole. Despite high standards of machine tool accuracy, some degree of position error is unavoidable: if the error is small it will be expressed as a lopsided thread, cut heavily on one side of the hole. Greater positioning error results in tap breakage, the probability of damage to the machine or workpiece and certain interruption of machine operation.

To deal with the positioning errors in machine tapping, "floating" toolholders were developed. Floating holders enable taps with a "lead" (the nose of the tap in the form of a truncated cone) to enter a drilled hole as the tap is advanced (fed) toward the workpiece, to recenter on the drilled hole and thereafter continue to rotate on the hole centerline as threading proceeds. The floating toolholder accommodates radial displacement of the tap centerline from the centerline of the driving spindle in which the shank is installed. Torsional rigidity and axial rigidity in compression are maintained so that the tap may be forcefully fed into the workpiece and so the device can resist torque loads imposed on the tap by thread cutting.

Prior art floating holders function by permitting translation (sliding) of the head simultaneously along two radial axes displaced by 90°. An intermediate coupling element that connects the shank (driving end) to the head (which holds the tap) carries the sliding elements. One popular design features a tongue and groove joint on each mating face of the coupling; another mounts radially disposed pins free to slide in radial holes in the head and shank.

Whereas these prior art toolholders serve their intended purpose, nevertheless they have several shortcomings. They are relatively complex, therefore, expensive. They are prone to breakage as many of their rather delicate small parts must be heat treated to high hardness (at the expense of toughness) to enhance wear resistance. Most holders can be used only with the tap size for which they were intended, others require separate adapter bushings. Current designs are prone to accumulating chips and grit that detract from the float, which, if left untended, eventually jam the unit completely.

SUMMARY OF THE INVENTION

Wherefore, it is an object of the present invention to overcome the aforementioned problems and drawbacks associated with the prior art designs.

The present invention relates to an improved floating toolholder of straightforward design. The invention provides a less complicated and inexpensive toolholder that allows floating to accommodate radial displacement. The invention provides a clearance between a pin and a shank which allows the attached tool, typically a tap, to enter a drilled hole on center and to remain on center during tapping. The clearance allows for the radial displacement of the tap centerline from the centerline of the driving spindle which holds and spins the shaft. The invention allows the start of the threading process with imperfect threads, but pulls the head into alignment with the hole before finished threads are generated.

According to the invention there is provided a tool holder that allows self-centering of a rotary tool supported by the holder comprising: a mounting head, having first and second ends, wherein, in use, a tool extends from the first end, said second end having a cavity; a shank defining a longitudinal axis and which extends into said cavity with a peripheral clearance therebetween; and a connecting member captively supported by said holder and connecting the head and shank together for rotation together about said longitudinal axis, said member extending through the cavity and transverse bores in the head and shank with clearance between the member and at least one of the head and shank which together with said peripheral clearance allow said self centering of such a rotary tool during use.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
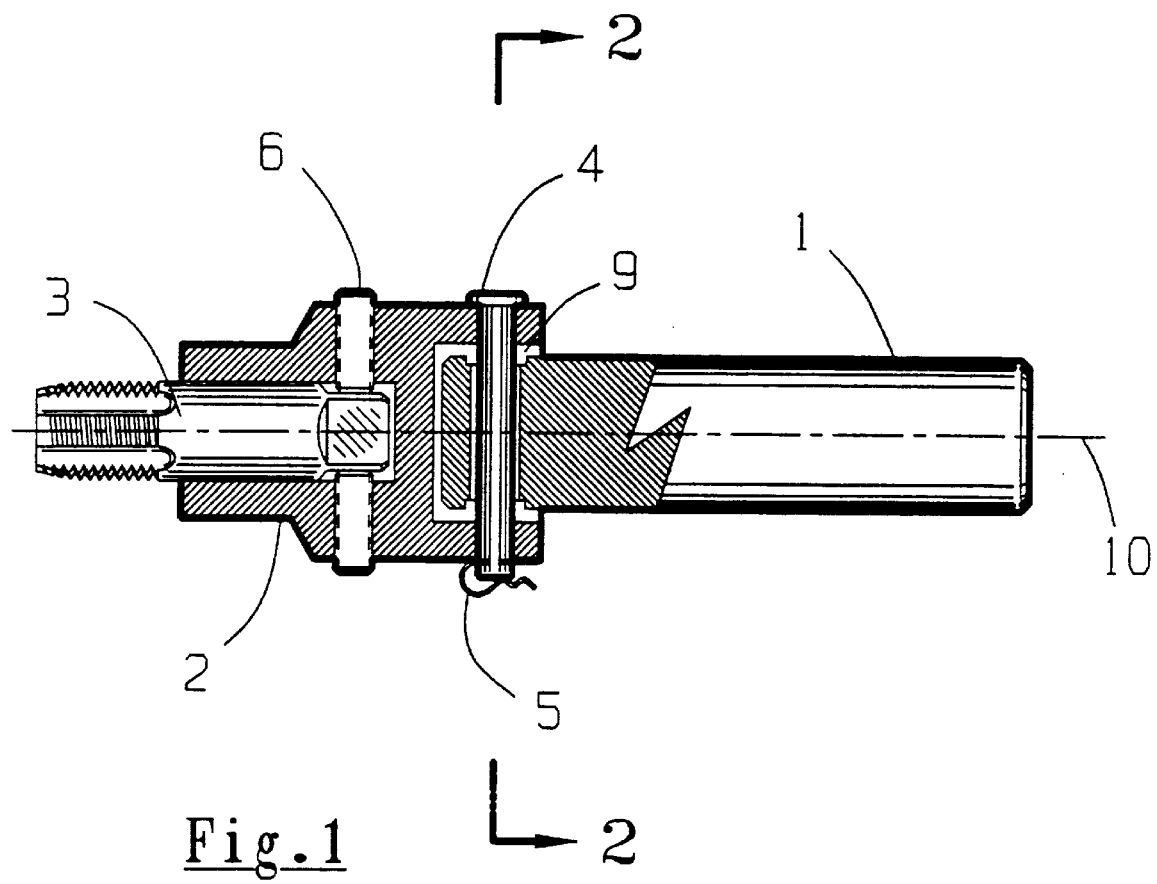
FIG. 1 is a partially sectional elevation of a floating toolholder according to the present invention with a threading tap 3 held fast thereby.

Turning now to FIG. 1, a detailed description concerning the present invention will now be provided. A cylindrical shank 1 is attached to tool mounting head 2 in which threading tap 3 is held fast by set screws 6. A pin 4 secures the shank 1 to the head 2 and is held in position by clip 5.

After the tap 3 is installed in mounting head 2, the toolholder is mounted by inserting shank 1 in a collet or like device provided on the machine spindle. Once tool projection adjustments are made the device is ready for service. The shank 1 defines a longitudinal axis 10.

Shank 1 extends into a cylindrical cavity 9 (bore) of mounting head 2 with diametral clearance slightly greater than twice the maximum anticipated eccentricity between the spindle and drilled hole centerlines of the hole (not shown) in which a thread is to be formed. Pin 4 is a sliding fit in mounting head 2 but a clearance fit in shank 1, the diametral clearance between pin 4 and shank 1 also being slightly greater than twice the anticipated eccentricity. The operation of the holder can be visualized by considering the position of the components in two principal positions: 1) when the center line 11 of pin 4 lies in the plane defined by the longitudinal axis 10 and centerline of the drilled hole (not shown) (FIG. 2), and 2) when the centerline 11 of pin 4 is perpendicular to said plane (FIG. 3).

Figures 2, 3:
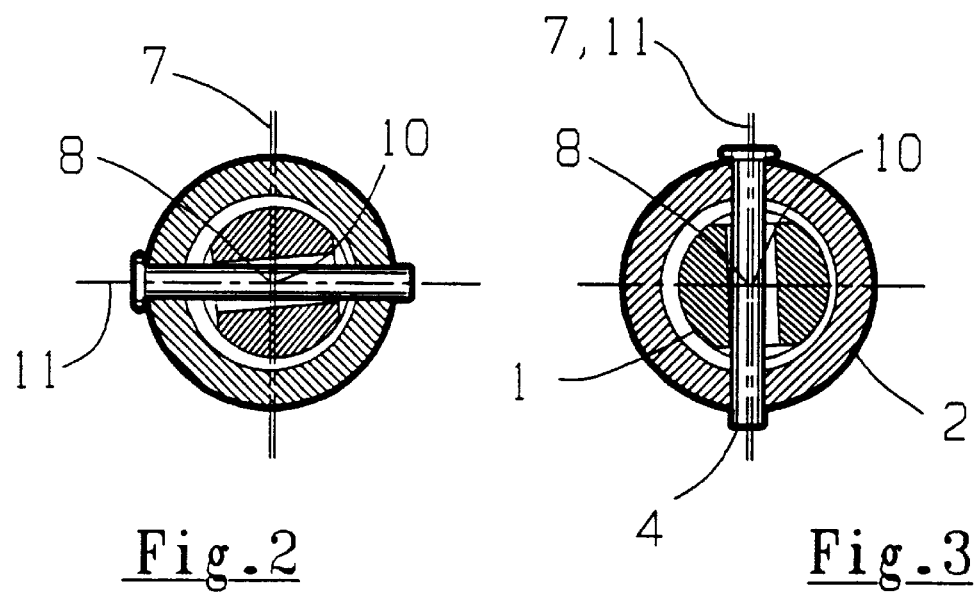
FIG. 2 is a sectional view of the subject toolholder on section line 2—2 of FIG. 1.
FIG. 3 shows a 90 degree rotation of the sectional view shown in FIG. 2.

FIG. 2 illustrates shank 1, head 2 and pin 4 at the point during rotation that the centerline 11 of pin 4 lies in the plane defined by the longitudinal axis 10 of the spindle and the axis 8 of the drilled hole through which axis 7 passes. Shank 1 has slid along pin 4 sufficiently to accommodate the eccentricity and there are two points of contact between the shank and pin through which torque is transmitted from the shank to the head.

FIG. 3 illustrates the shank 1, head 2 and pin 4 at the point during rotation that the centerline 11 of pin 4 is perpendicular to the aforementioned plane. Only a single point of contact remains between the shank 1 and pin 4. The side loading given rise to during this portion of the rotation might give cause to suspect that the threading would be somewhat eccentric to the drilled hole, but that has not proved to be the case. It is conjectured that the tap "snakes" into the hole, on its lead, at the start of the threading process when imperfect (shallow) threads are being generated. Before the first finished threads are generated, the tap has pulled the head into alignment with the hole.

The subject holder has benefits beyond simplicity of design and ease of manufacture. It has been shown that the unit performs well even if the components are not made of tool steel and are not heat treated. If "soft" steel is used, the material displaced by the pin at the points of contact with the hole in shank 1 is accommodated by flats cut in shank 1 at each end of the hole. The head 2 and tap 3 may easily be changed as a unit by removing the retaining clip 5 and pin 4. Often the shanks are permanently mounted in the machines and the heads are interchanged (the shanks and pins are common). The unit does not tend to pick up chips or grit as there are not joints or openings facing the workpiece.

Wherefore, I claim:

1. A tool holder that allows freely floating self-centering of a rotary tool supported by the holder comprising:

a mounting head, having first and second ends, wherein, in use, a tool extends from the first end, said second end having a cavity;

a shank defining a longitudinal axis and which extends into said cavity with a peripheral clearance therebetween; and a connecting member longitudinally and radially captively supported by said holder and axially connecting the head and shank together for rotation together about said longitudinal axis, said member extending through the cavity and transverse bores in the head and shank with clearance between the member and at least one of the head and shank which together with said peripheral clearance allow said self centering of such a rotary tool during use.

2. A tool holder according to claim 1 wherein the member has a sliding fit through said bore of the mounting head, and a clearance fit through said bore of the shank.

3. A tool holder according to claim 1 wherein a device securely engages the tool at the first end of said mounting head.

4. A tool holder according to claim 1 wherein the member comprises one of a pin, a bolt and a dowel.

5. A tool holder according to claim 1 wherein the member comprises one of a pin, a bolt, and a dowel used in combination with a fastener providing the captive support.

6. A tool holder according to claim 5 wherein said fastener is a clip.

7. A tool holder according to claim 1 wherein the cavity is a cylindrical bore centered on said longitudinal axis and at least the portion of the shank extending into the cavity is cylindrical.

8. A tool holder according to claim 1 wherein said bore of the shank is perpendicular to said longitudinal axis.

9. A tool holder according to claim 1 wherein said shank has an end distal to the bore of the shank that attaches to a collet on a machine spindle.

10. A tool holder according to claim 1 which supports such tool in the form of a tap.

11. A tool holder according to claim 1 wherein the member is a cylindrical pin and the bores are aligned, the pin defining a transverse axis normal to and passing through said longitudinal axis.

12. A tool holder that allows freely floating self-centering of a rotary tool supported by the holder comprising:

a mounting head, having first and second ends, wherein, in use, a tool extends from the first end, said second end having a cavity;

a shank defining a longitudinal axis and which extends into said cavity with a peripheral clearance therebetween; and a connecting member longitudinally and radially captively supported by said holder and axially connecting the head and shank together for rotation together about said longitudinal axis, said member extending through the cavity and transverse bores in the head and shank with a clearance between the member and at least one of the head and shank which together with said peripheral clearance allow said self centering of such a rotary tool during use, wherein said clearance is at least greater than twice the anticipated eccentricity between the cross-sectional centerline of said shank and the centerline of a workpiece hole.

\* \* \* \* \*